United States Patent
Topaloglu (10) Patent No.: US 10,916,253 B2
(45) Date of Patent: Feb. 9, 2021

(54) SPOKEN MICROAGREEMENTS WITH BLOCKCHAIN

(71) Applicant: International Business Machines Corporation, Armonk, NY (US)

(72) Inventor: Rasit O. Topaloglu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 16/173,939

(22) Filed: Oct. 29, 2018

(65) Prior Publication Data
US 2020/0135207 A1    Apr. 30, 2020

(51) Int. Cl.
| G10L 15/30 | (2013.01) |
| G10L 15/22 | (2006.01) |
| G06Q 10/10 | (2012.01) |
| G10L 15/26 | (2006.01) |

(52) U.S. Cl.
CPC .............. *G10L 15/30* (2013.01); *G06Q 10/10* (2013.01); *G10L 15/22* (2013.01); *G10L 15/26* (2013.01)

(58) Field of Classification Search
CPC ....... G10L 15/30; G10L 15/22; G10L 15/265; G06Q 10/10
See application file for complete search history.

(56) References Cited

U.S. PATENT DOCUMENTS

| 6,581,035 | B1 | 6/2003 | Madan et al. |
| 6,754,831 | B2* | 6/2004 | Brownell ............ H04L 63/0272 709/223 |
| 9,569,771 | B2 | 2/2017 | Lesavich et al. |
| 9,608,829 | B2 | 3/2017 | Spanos et al. |
| 9,635,000 | B1 | 4/2017 | Muftic |
| 9,722,790 | B2 | 8/2017 | Ebrahimi |
| 9,807,106 | B2 | 10/2017 | Daniel et al. |
| 9,853,819 | B2 | 12/2017 | Truu et al. |
| 9,870,562 | B2 | 1/2018 | Davis et al. |
| 9,870,591 | B2 | 1/2018 | Shah |
| 9,882,918 | B1 | 1/2018 | Ford et al. |
| 10,002,639 | B1* | 6/2018 | Gaeta ................. G11B 27/031 |
| 2003/0154162 | A1 | 8/2003 | Danaher et al. |
| 2008/0177536 | A1* | 7/2008 | Sherwani ............... G11B 27/10 704/235 |
| 2013/0266127 | A1* | 10/2013 | Schachter ........... H04M 3/5175 379/88.01 |
| 2015/0278820 | A1 | 10/2015 | Meadows |
| 2016/0165346 | A1* | 6/2016 | Ushio ................... G06F 3/0488 381/58 |
| 2017/0103167 | A1 | 4/2017 | Shah |
| 2017/0337558 | A1 | 11/2017 | Corritori |
| 2018/0183737 | A1 | 6/2018 | Subbarayan et al. |
| 2018/0189273 | A1 | 7/2018 | Campos et al. |
| 2019/0289046 | A1* | 9/2019 | Weber ................. H04L 65/4053 |
| 2019/0294804 | A1* | 9/2019 | Di Lella ............... G06F 21/602 |
| 2019/0341050 | A1* | 11/2019 | Diamant .................. H04N 7/15 |

FOREIGN PATENT DOCUMENTS

WO    9946913  A1   9/1999

OTHER PUBLICATIONS

Liang et al., ProvChain: A Blockchain-based Data Provenance Architecture in Cloud Environment with Enhanced Privacy and Availability, 2017, IEEE/ACM , whole document (Year: 2017).*

Peter Liu and Xin Pan, "Text summarization with TensorFlow," Google AI Blog, Aug. 26, 2016, 4 pages.

* cited by examiner

*Primary Examiner* — Sonia L Gay
(74) *Attorney, Agent, or Firm* — Patterson + Sheridan, LLP (57) ABSTRACT

Method, system, and apparatus for storing conversation data of a conversation onto a blockchain network, the conversation data comprising terms of an agreement, the method comprising: receiving audio data of a conversation between two or more participants; creating a transcript of at least some of the audio data; accessing a database comprising a plurality of words or phrases. The method, system, and apparatus are also for obtaining, from the database, predefined one or more words associated with a predefined topic; searching the transcript for the predefined one or more words; filtering the transcript based on the predefined one or more words; and storing the conversation data onto a first block of a blockchain stored on the blockchain network, wherein the conversation data comprises the filtered transcript.

20 Claims, 6 Drawing Sheets

SPOKEN MICROAGREEMENTS WITH BLOCKCHAIN

BACKGROUND

The present invention relates to storing spoken agreement data on a blockchain, and more specifically, to obtaining agreement data, processing the data, storing the agreement data and/or the processed data on a blockchain, and providing accessibility to the stored agreement data.

When two or more people discuss terms of an agreement, they might not feel comfortable going through a post-agreement process of formalizing terms of the deal in writing. A request to formalize an agreement in writing can signal mistrust and can result in a barrier to the deal. However, after a verbal deal is made, one of the parties to the agreement might misremember and disagree on the terms, resulting in lost time, lawsuits, and other costs. A solution that memorializes an agreement while minimizing agreement barriers can lower costs of contract creation.

SUMMARY

According to one embodiment of the present invention, a method, system, and computer program product for storing conversation data of a conversation onto a blockchain network, the conversation data comprising terms of an agreement, the method comprising: receiving audio data of a conversation between two or more participants; creating a transcript of at least some of the audio data; accessing a database comprising a plurality of words or phrases; obtaining, from the database, predefined one or more words associated with a predefined topic; searching the transcript for the predefined one or more words; filtering the transcript based on the predefined one or more words; and storing the conversation data onto a first block of a blockchain stored on the blockchain network, wherein the conversation data comprises the filtered transcript.

DETAILED DESCRIPTION

The present disclosure provides a technique of obtaining conversation data, processing the data, and storing the data on a blockchain in a way that minimizes cost of memorializing an agreement or reducing an agreement to writing, while lowering barriers to the creation of an agreement.

For example, person A might be discussing with person B potentially lending money from person A to person B. Creating a formal agreement might prevent the lending from taking place, because it might signal distrust by one of the parties, and might hurt the relationship between person A and person B. Before discussing the terms, person A asks person B if it is OK that their discussion be recorded and then stored onto a blockchain for reference in the future. Person A then turns on a voice assistant, which records the conversation. The voice assistant then processes the conversation to obtain a text transcript and text summary of the conversation, and posts the recording, transcript, and/or summary to the blockchain for future reference.

One advantage of using a blockchain network to store conversation data is that blockchains carry a certain degree of trust, and in the case of a public blockchain network, openness and transparency. Trust, openness, and transparency are often conducive to deal making and can allow parties to memorialize or reduce to writing an agreement while lowering barriers to reaching that agreement.

Figure 1:
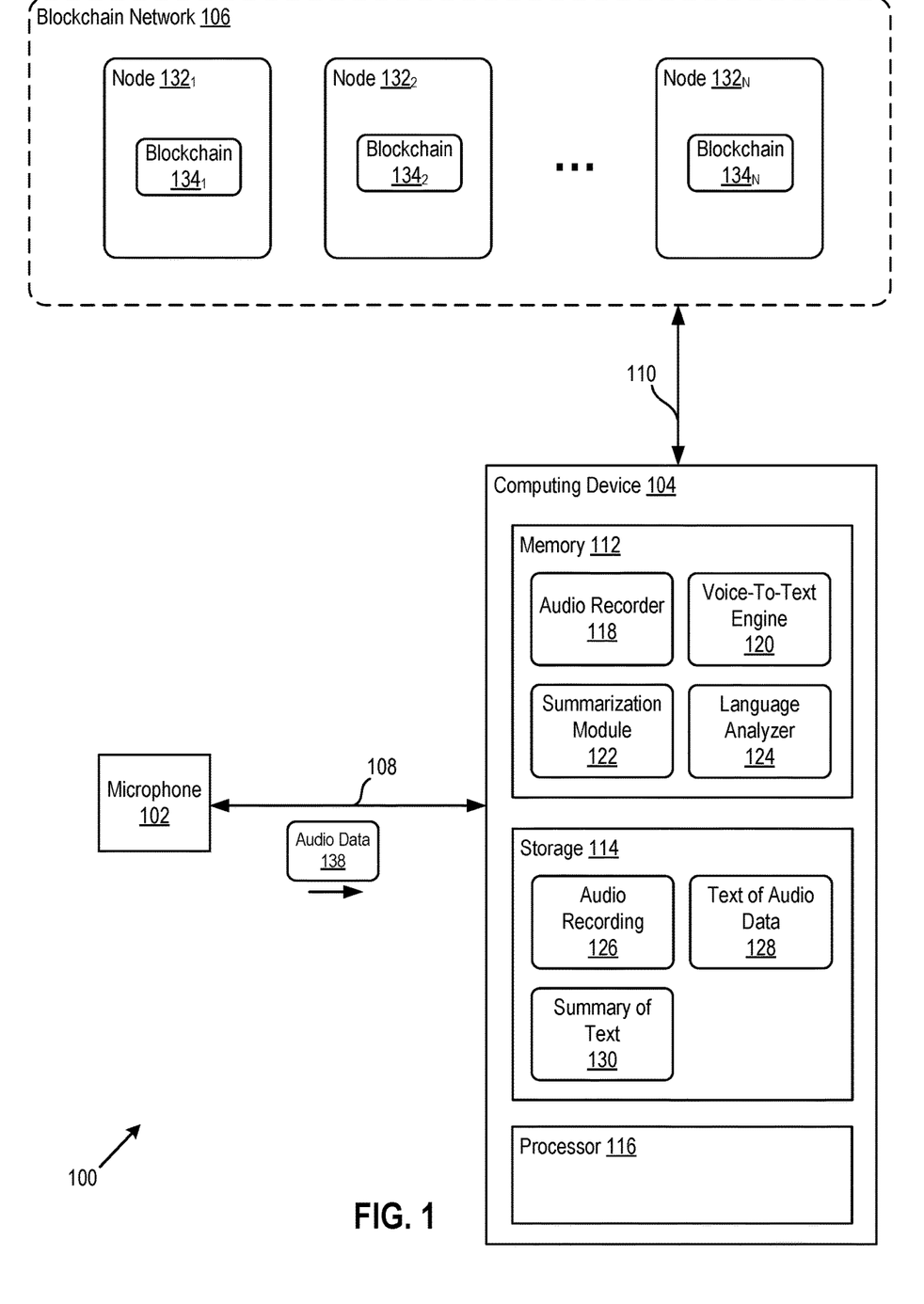
FIG. 1 depicts a block diagram of a computing system in which one or more embodiments of the present disclosure may be utilized.

FIG. 1 depicts a block diagram of a computing system 100 in which one or more embodiments of the present disclosure may be utilized. FIG. 1 depicts one or more microphones 102, a computing device 104, and a blockchain network 106 connected by networks 108 and 110. The network 108 connects the microphone 102 and the computing device 104. The network 110 connects the computing device 104 and the blockchain network 106. Each network 108 and 110 may be, for example, a direct link, a local area network (LAN), a wide area network (WAN) such as the Internet, another type of network, or a combination of networks. Although the networks 108 and 110 are shown as two separate networks, networks 108 or 110 may be part of the same network.

The microphone 102 detects sound, converts the sound into electrical signals, transmits the electrical signals to the computing device 104. The electrical signals may be referred to herein as "audio data" 138 or "stream of the audio data 138" of the microphone 102. The detected sound may be, for example, a conversation between two or more people regarding an agreement. The microphone 102 may be a stand-alone microphone. The microphone 102 may be a component of a device, such as for example the computing device 104, an audio recorder, a phone (e.g., smart phone), or a voice assistant. Although the microphone 102 is shown as being separate from the computing device 104, the microphone 102 may be a component of the computing device 104.

The computing device 104 receives the audio data 138 from the microphone 102 and performs processing and storage of the received audio data 138, as described below. The computing device also transmits data to the blockchain network 106 for storage on the blockchain network 106.

The computing device 104 comprises a memory 112, a storage 114, and a processor 116. The memory 112 may include one or more random access memory modules that exist at multiple levels of a memory hierarchy and can range from high speed registers and caches to lower speed DRAM chips.

The memory 112 comprises an audio recorder 118, a voice-to-text engine 120, a summarization module 122, and a language analyzer 124. Although the audio recorder 118, the voice-to-text engine 120, the summarization module 122, and the language analyzer 124, and are shown in FIG. 1 as software modules, in an embodiment, they may each be a physical device.

The audio recorder 118 receives the audio data 138 of the microphone 102 and stores the audio data 138 on the storage 114 as audio recording 126. The audio recording 126 is an audio file, such as for example a .mp3, .wav, or a .pcm file.

The voice-to-text engine 120 converts the audio recording 126 or a stream of the audio data 138 into natural language embodied in the electrical signals. For example, the audio data transmitted from microphone 102 to computing device may comprise a conversation about terms of a deal, and voice-to-text engine 120 converts the audio data 138 of that conversation into human-readable text that is a transcript of that conversation. The voice-to-text engine 120 stores the human-readable text file on the storage 114 as text of audio data 128. The text of audio data 128 is a text file, such as for example a .txt, .rtf, .doc, or a .pdf file.

The summarization module 122 is a natural language processing (NLP) module that analyzes human-readable text and generates a summary of that text. For example, the summarization module 122 may analyze the text of audio data 128 to generate a summary, and to store that summary on storage 114 as summary of text 130. The summary of text 130 is a text file, and may be the same or a similar format as the text of audio data 128. The summarization module 122 may employ one or more text summarization techniques known in the art.

The language analyzer 124 analyzes language to determine the topic being discussed at a given time or time range during a conversation or in a recording of a conversation between people. As used herein, the term "analyze" includes searching and finding certain words or phrases within data, such as audio or text data. In an embodiment, the language analyzer 124 specifically detects words and phrases that indicate that an agreement or a deal is being discussed. In an embodiment, to determine the topic of discussion, the language analyzer may access a list or database (not shown) of words and/or phrases that are associated with a given topic, and the language analyzer may then identify those words or phrases within text or sound data. In another embodiment, the language analyzer 124 may be a machine learning model or a combination of several machine learning models trained to determine a topic of conversation during a discussion, such as when the topic of conversation is a negotiation or a making of a deal.

The language analyzer 124 may analyze a stream of the audio data 138 of the microphone 102. Or, the language analyzer 124 may utilize the voice-to-text engine 120 to convert streaming audio data 138 to text, and to analyze the converted text in real-time as the audio data 138 is received. When the language analyzer 124 detects that words or phrases relating to deal making are being spoken, the language analyzer 124 may activate audio recorder 118 to begin recording the conversation. Alternatively or in addition, the language analyzer 124 may analyze audio recording 126 and/or text of audio data 128 to identify sentences that contain terms relating to deal making, and the language analyzer 124 may then create a human-readable summary of deal terms 136 based on the analysis of audio recording 126 and/or text of audio data 128. The summary of deal terms 136 is a text file and may be the same or a similar format as the text of audio data 128.

The storage 114 is a persistent storage device. The storage 114 comprises the audio recording 126, the text of audio data 128, the summary of text 130, and the summary of deal terms 136. The components 126, 128, 130, and 136 are described above with reference to components of the memory 112. Although the storage 114 is shown as a single unit, the storage 114 may be a combination of fixed and/or removable storage devices, such as fixed disc drives, solid state drives, or removable memory cards. The memory 112 and the storage 114 may be part of one virtual address space spanning multiple primary and secondary storage devices.

The processor 116 is representative of a single central processing unit (CPU), multiple CPUs, a single CPU having multiple processing cores, and the like.

The blockchain network 106 is a network comprising a plurality of nodes 132. Each node 132 is connected to at least one other node 132 within the blockchain network 106. The connection (not shown) between each node 132 may be a direct link, or may be a network, such as a LAN or a WAN (e.g., the Internet). Each node 132 may be a physical device, or may be a virtual computing instance, such as a virtual machine. The blockchain network 106 may be a private network controlled by a single entity. The private blockchain network may require centrally-granted permission in order to access information stored on the blockchain network 106. Alternatively, the blockchain network 106 may be a public network, where access to data on the public network is open to the public.

The node 132 of the blockchain network 106 comprises a distributed blockchain 134. The blockchain 134 is a distributed data structure comprising multiple instance or copies (i.e., blockchain $134_1$-$134_N$) of the distributed blockchain 134. The copies of blockchain 134 are synchronized through a consensus mechanism. The consensus mechanism that synchronizes blockchains 134 may be, for example, proof-of-work, proof-of-stake, or another consensus mechanism. Each copy of blockchain 134 located on node 132 may be a full copy of the blockchain data structure 134 or a partial copy of the blockchain data structure 134. An exemplary instance of blockchain 134 is described with reference to FIG. 2.

Figure 2:
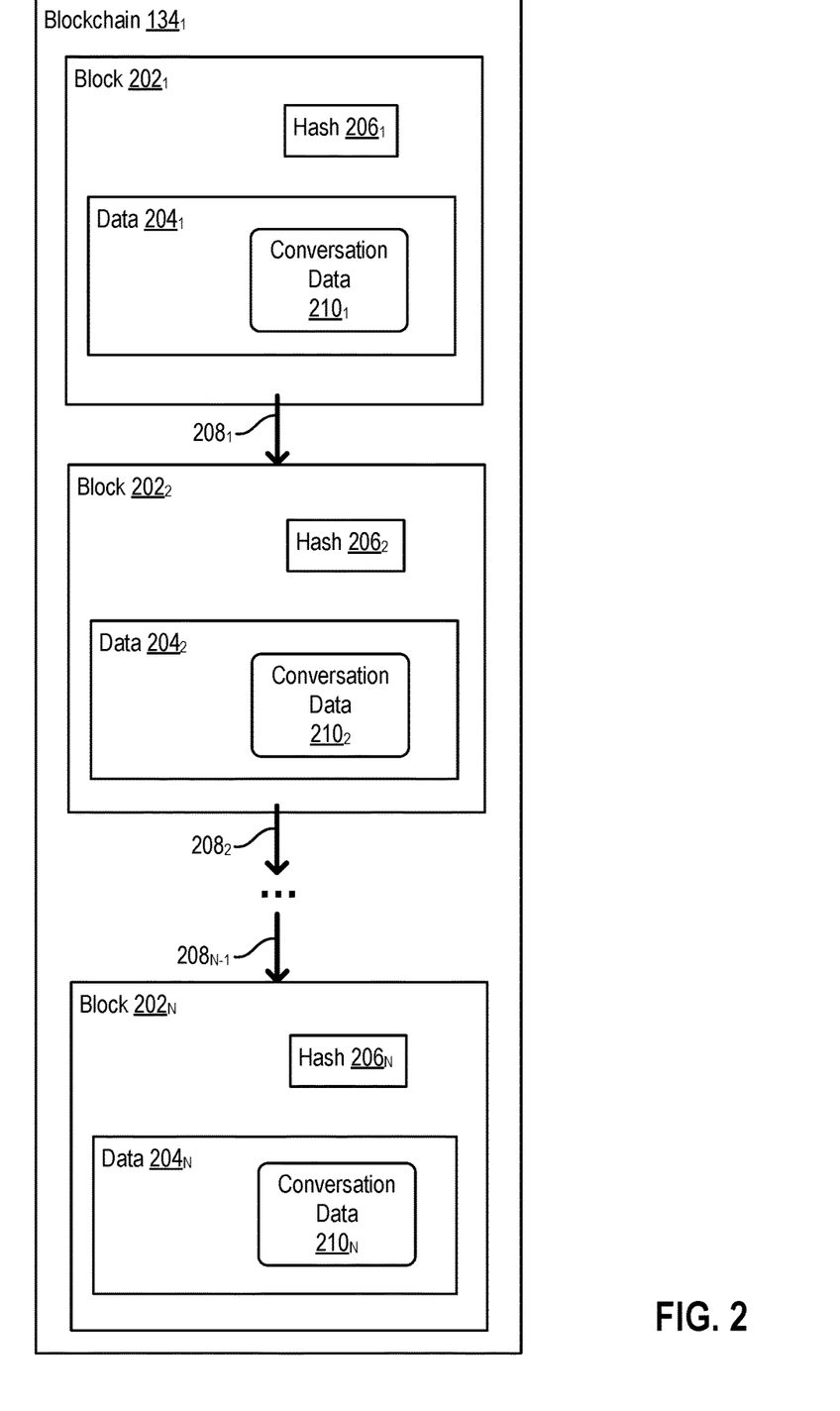
FIG. 2 is a block diagram of an exemplary copy of a blockchain, according to an embodiment.

FIG. 2 is a block diagram of an exemplary copy of the blockchain 134, according to an embodiment. Although FIG. 2 is shown to depict the blockchain $134_1$, the blockchain shown in FIG. 2 may be the blockchain $134_1$, $134_N$, or any copy of the blockchain data structure 134 on any node 132 of the blockchain network 106.

The blockchain $134_1$ comprises a plurality of blocks 202 linked by pointers 208. Each block 202 contains data 204, a hash 206, and a pointer 208 pointing to the next block 202. The last block $202_N$ of the blockchain $134_1$ may have no pointer 208 or may have a pointer with a NULL value. Data 204 comprises conversation data 210, which is data of a conversation between parties, and the conversation data 210 comprises terms of a deal or contract reached by the parties. Conversation data 210 is further described with reference to FIG. 3A, below. Data 204 and/or conversation data 210 may be encrypted by an encryption algorithm, such as TripleDES or another encryption algorithm.

The hash 206 is an output of a hash function, the input of the hash function comprising (a) hash 206 of the previous block, and (b) data 204 of the block containing the hash 206. For example, hash $206_2$ is an output of a hash function, wherein the input comprises data $204_2$ and hash $206_1$. The first block $202_1$ of the blockchain $134_1$ may have a hash $206_1$, such that the input to the hash function producing hash $206_1$ comprises data 204 and not hash 206 of the previous block, because block $202_1$ is the first block of the blockchain $134_1$. The hash function used to produce hash 206 may be, for example, secure hash algorithm (SHA)-3, SHA-256, or another hash algorithm.

Figure 3A:
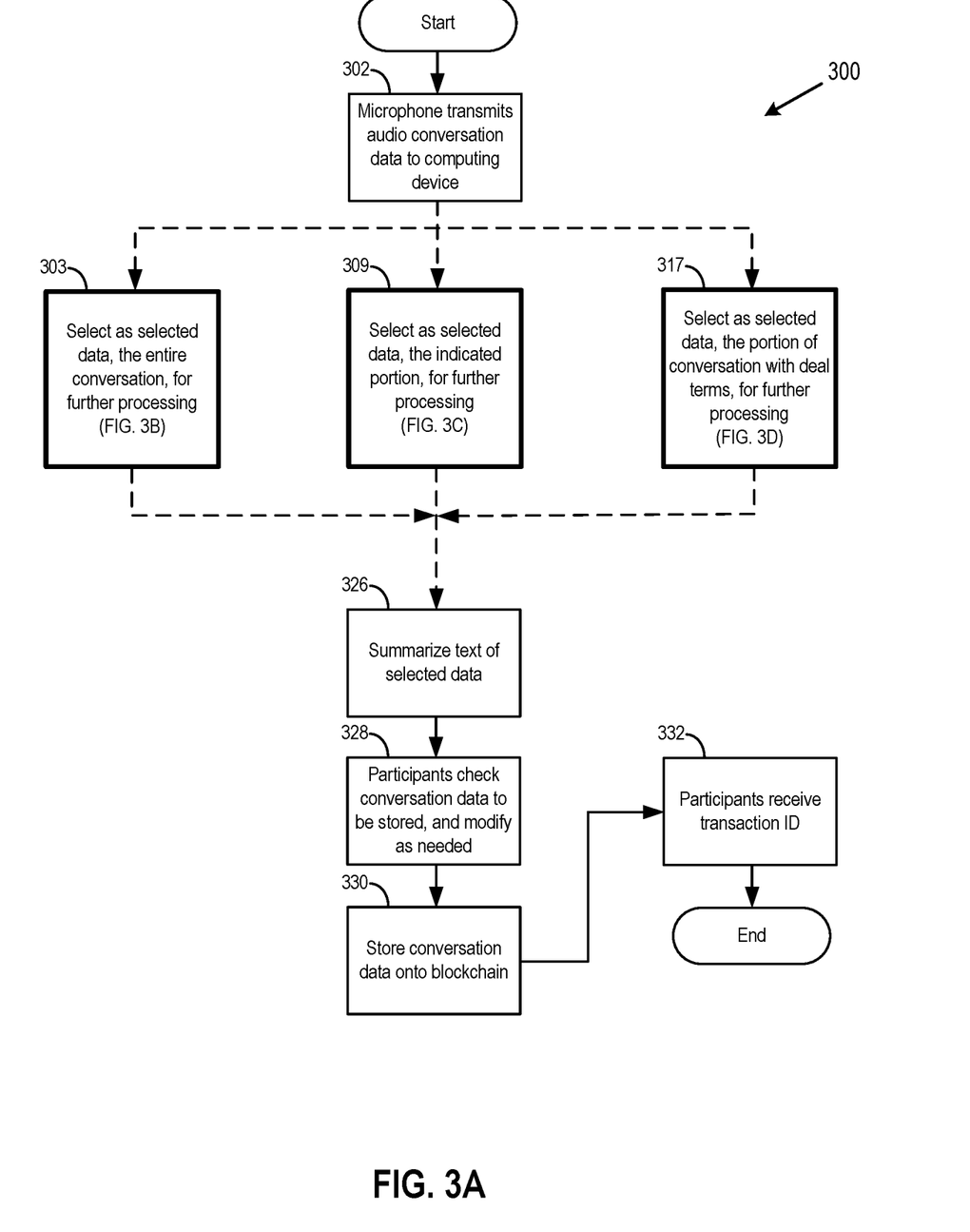
FIG. 3A depicts a flow diagram of a method of processing audio data and of storing conversation data comprising terms of an agreement onto a distributed blockchain, according to an embodiment.

FIG. 3A depicts a flow diagram of a method 300 of processing audio data 138 and of storing conversation data 210 comprising terms of an agreement onto a distributed blockchain 134, according to an embodiment.

At block 302, one or more microphones 102 detect sound, convert the sound to electrical signals, and transmit the electrical signals as audio data 138 to computing device 104. For example, the sound detected by the microphone 102 may be indicative of a conversation between parties that are discussing terms of a deal.

After block 302, method 300 continues to one of block 303, 309, and 317, depending on implementation of the method 300. Block 303 represents one embodiment of selecting data for further processing, block 309 represents a second embodiment, and block 317 represents a third embodiment. The third embodiment of block 317 may be regarded as a more specific sub-embodiment of the second embodiment of block 309. Block 303 is further expanded in FIG. 3B. Block 309 is further expanded in FIG. 3C. Block 317 is further expanded in FIG. 3D. As used herein, "further processing" of selected data is the performance of any of blocks 326-330, inclusive.

Figure 3B:
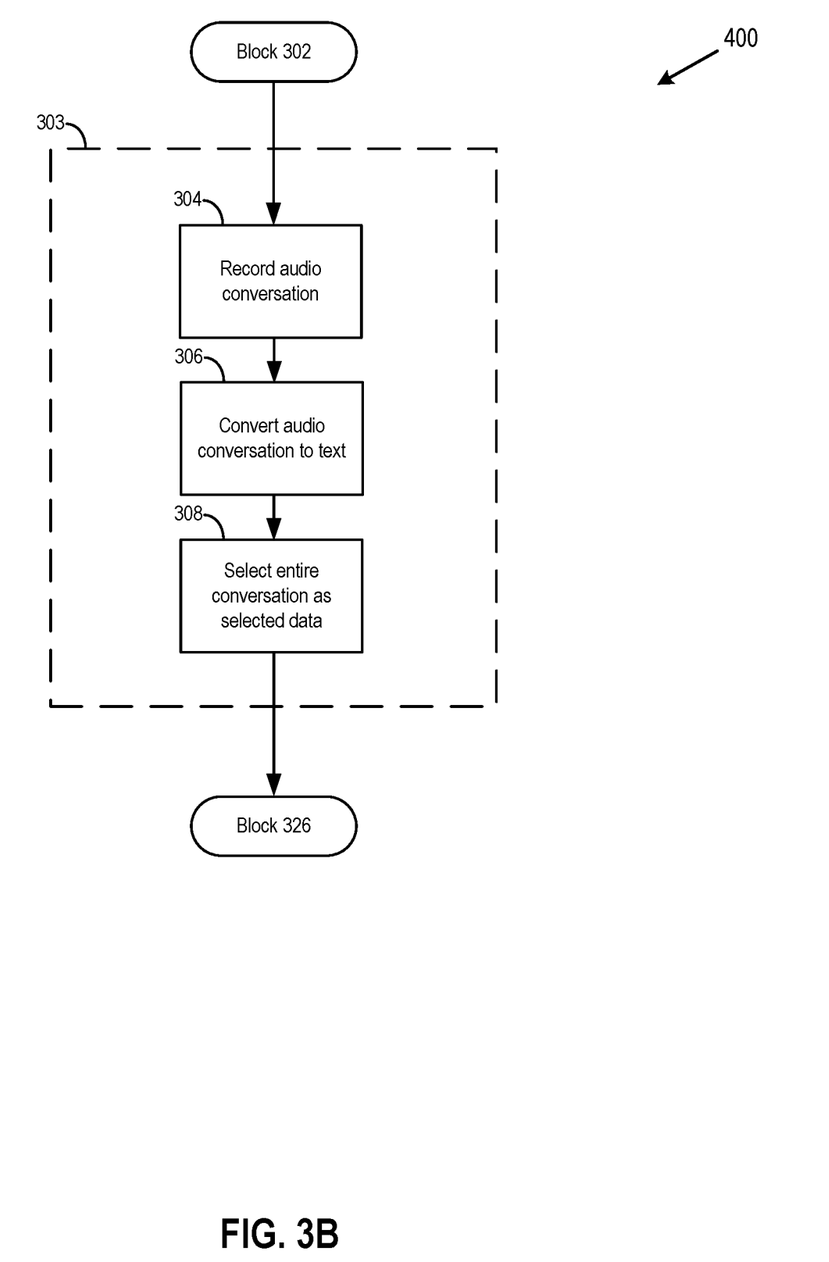
FIG. 3B depicts a flow diagram of a method of selecting data for further processing, according to a first embodiment.

FIG. 3B depicts a flow diagram of a method 400 of selecting data for further processing, according to an embodiment. FIG. 3B is an expansion of block 303 of FIG. 3A. FIG. 3B represents a first embodiment of selecting data for further processing.

At block 304, the audio recorder 118 receives the audio data 138 transmitted by the microphone 102 and records the audio data 138 as the audio recording 126 on the storage 114. Following the above example of block 302, the audio recorder 118 makes a recording of a conversation between parties discussing terms of a deal, and audio recorder 118 stores the recording on storage 114.

At block 306, the voice-to-text-engine 120 converts audio recording 126 to human-readable text, and stores the text as text of audio data 128. Optionally, block 304 may be skipped and at block 306, voice-to-text engine 120 converts a stream of audio data 138 from the microphone 102 into text, and stores the text as text of audio data 128. Following the example of block 302, the voice-to-text engine 120 creates a text transcript of the conversation transmitted by the microphone 102 and stores the transcript on the storage 114.

At block 308, computing device 104 or a component of computing device 104 selects all of audio recording 126 and/or text of audio data 128 for optional further processing. Following the example of block 302, computing device 104 selects the entire conversation transmitted by the microphone 102 for further processing. After block 308, the method 400 continues to block 326 of FIG. 3A.

Figure 3C:
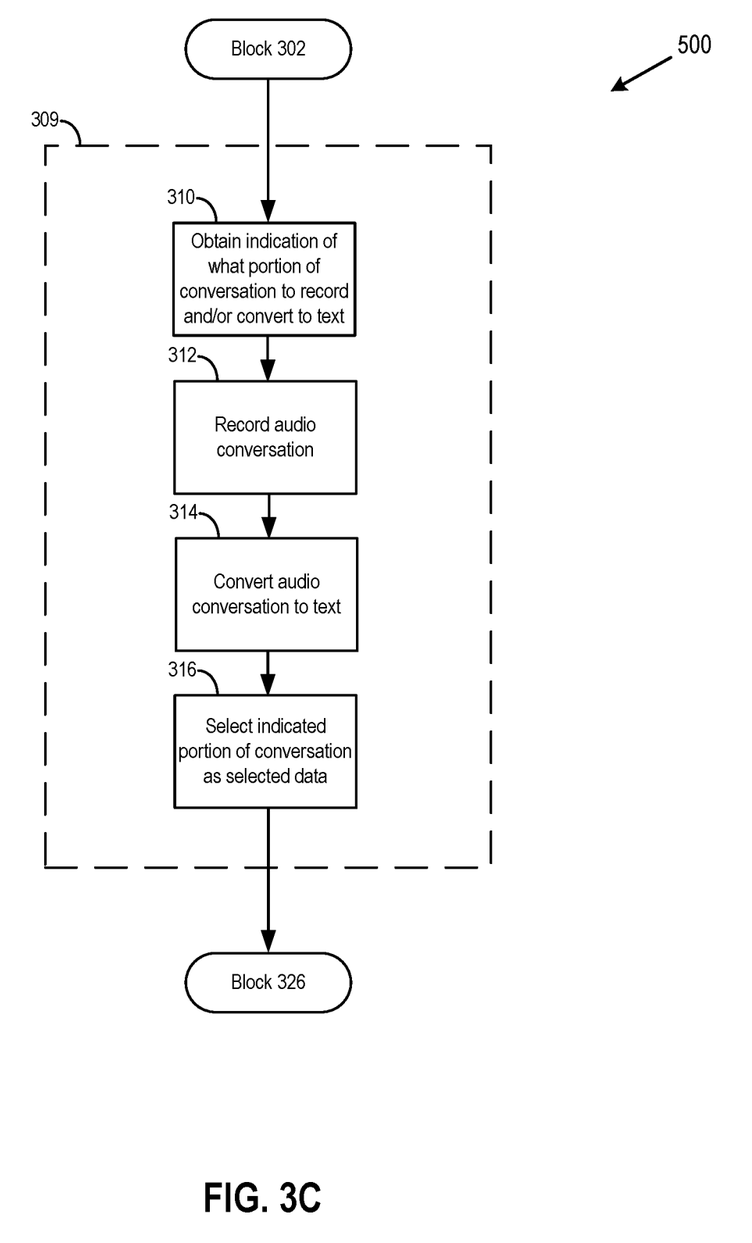
FIG. 3C depicts a flow diagram of a method of selecting data for further processing, according to a second embodiment.

FIG. 3C depicts a flow diagram of a method 500 of selecting data for further processing, according to an embodiment. FIG. 3C is an expansion of block 309 of FIG. 3A. FIG. 3C represents a second embodiment of selecting data for further processing.

At block 310, computing device 104 receives or obtains indication of what portion of received audio data 138 to record and/or convert to text. The indication may be provided by a participant of the conversation that is detected to generate the audio data 138. Alternatively, the indication may be previously predefined and stored on a storage device accessible to computing device 104, such as on storage 114. The indication may refer to the portion that is to be recorded or selected. The indication may be, for example, a time indication or a topic indication. For example, the indication may indicate that the last five minutes of the recorded conversation is to be converted to text and selected for further processing. The rest of the recording may be discarded. The action of recording may be performed by the audio recorder 118. The conversion to text may be performed by the voice-to-text engine 120.

For a second example, the indication may indicate that when a word or phrase relating to a price is mentioned during the conversation, then the recording is to begin. For a third example, the indication may indicate that when words or phrases relating to deal making generally are mentioned during the conversation, then the live or real-time stream of conversation audio data 138 is to begin to be converted to text by voice-to-text engine 120. In these second and third examples, topic determination may be performed by the language analyzer 124, and the recording may be performed by the audio recorder 118.

At block 312, the audio recorder 118 records the audio data 138 of the microphone 102 and stores the recording as the audio recording 126. As discussed at block 310, the trigger for the start of recording of the audio data 138 may be the indication of block 310, such as an indication of a time or a topic at which recording is to begin. The audio recording 126 may be a recording of a full conversation or of a portion of conversation, the portion being determined or based on the indication obtained at block 310. Block 312 is optional in that an audio recording may be by passed, and rather the real-time stream of the audio data 138 may be converted to text at block 314 without first recording the audio data 138 to a file.

At block 314, the streamed audio data 138 or the audio recording 126 of block 312 is converted to human-readable text by voice-to-text engine 120. The human-readable text is stored on the storage 114 as the text of audio data 128. As discussed at block 310, the trigger for the start of conversion of the audio data 138 to text may be the indication of block 310, such as an indication of a time or a topic at which conversion is to begin.

In an embodiment, at block 314, the voice-to-text engine 120 works in conjunction with the language analyzer 124 to identify sentences within a real-time stream of the audio data 138 or the audio recording 126. The identified sentences are ones that are related to a given topic, such as the topic of deal making. As used herein, a sentence "related" to a topic may be a sentence that contains a word or a phrase relating to a topic. As discussed above, the language analyzer may access a list or database (not shown) of words and/or phrases that are associated with a given topic to make such a determination. The voice-to-text engine 120 then transcribes as human-readable text only the sentences relating to the topic, and optionally, sentences near each sentence that relates to the topic. As used herein, a sentence "near" another sentence may mean located within one sentence, within two sentences, within five sentences, or within ten sentences of the sentence relating to the topic. A sentence "near" another sentence may also mean spoken (e.g., initiated or completed) within five seconds, ten seconds, thirty seconds, or one minute of the sentence relating to the topic.

At block 316, the portion of the audio data 138 indicated by the indication of block 310 is selected for further processing. The selected portion may be the audio recording 126 and/or the text of audio data 128. In an embodiment, the portion indicated by indication of block 310 is first identified within the text of audio data 128. Then, based on the indicated portions of text of audio data 128, the portions of audio recording 126 that correspond to the indicated portions of text of audio data 128 are identified. For example, after identifying the text that establishes an agreement between the parties, the system identifies the corresponding portions of the audio data which can be removed from the remaining portion of the audio. Then, both of the following are selected for further processing (e.g., storing on the blockchain 134): (a) indicated portions of text of audio data 128, and optionally sentences near the indicated portions, and (b) indicated portions of the audio recording 126, and optionally sentences near the indicated portions. In another embodiment, at block 316, the language analyzer 124 identifies sentences within text-of-audio data 128 that are related to a given topic, such as the topic of deal making. The language analyzer 124 then selects for further processing sentences relating to the topic, and optionally, sentences near each sentence that relates to the topic. The language analyzer 124 or computing device 104 may generate a new file comprising the selected data (i.e., the selected sentences). As used herein, a "filtered audio recording" may refer to a new audio file generated by the language analyzer, the new audio file comprising the selected data (i.e., the selected sentences). After block 316, the method 500 continues to block 326 of FIG. 3A.

Figure 3D:
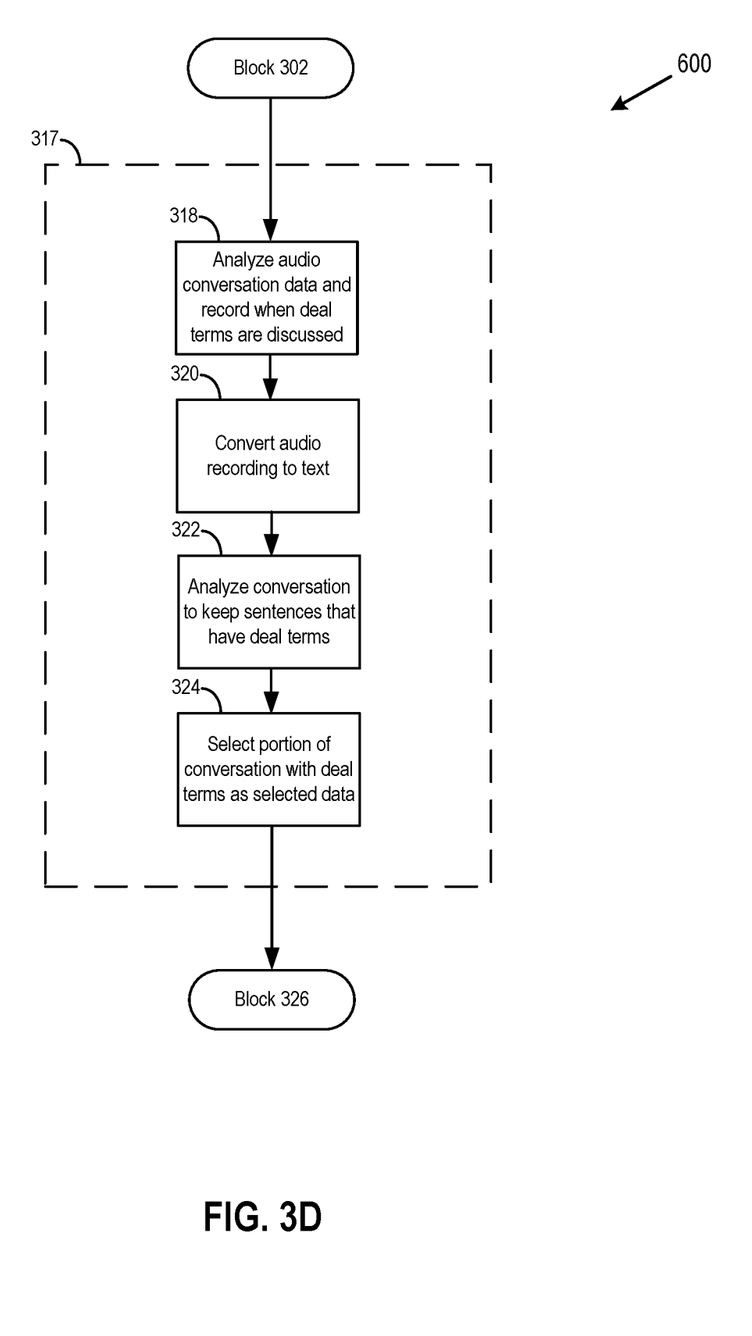
FIG. 3D depicts a flow diagram of a method of selecting data for further processing, according to a third embodiment.

FIG. 3D depicts a flow diagram of a method 600 of selecting data for further processing, according to an embodiment. FIG. 3D is an expansion of block 317 of FIG. 3A. FIG. 3D represents a third embodiment of selecting data for further processing, and may be regarded as a more specific sub-embodiment of FIG. 3C.

At block 318, the computing device 104 receives audio data 138, and the language analyzer 124 analyzes the real-time audio data stream 138 for language indicating deal making. When language indicating deal making is detected by the language analyzer 124, that detection serves as a trigger for the audio recorder 118 to begin recording the stream of conversation audio data 138 as the audio recording 126.

At block 320, the voice-to-text engine 120 converts the audio recording 126 to human-readable text, i.e., text of audio data 128. The voice-to-text engine 120 saves the text of audio data 128 to the storage 114.

At block 322, language analyzer 124 analyzes text of audio data 128 to identify sentences related to the topic of deal making. The language analyzer 124 then keeps within text of audio data the sentences relating to the topic, and optionally, sentences near each sentence that relates to the topic, while removing the rest of the sentences. Alternatively, rather than removing sentences, the language analyzer may generate a new file (not shown) comprising the kept sentences and not comprising other sentences of the text of audio data 128, without modifying the text of audio data 128.

At block 324, computing device 104 selects the kept sentences of block 322 as selected data for further processing. The selected data may also include some or all of the audio recording 126 of block 318. After block 324, the method 600 continues to block 326 of FIG. 3A.

At block 326, summarization module 122 summarizes the text of the selected data of block 308, 316, or 324 to generate summary of text 130. The text of the selected data may include text of audio data 128. The summary of text 130 is a text file of human-readable text, and may be the same or a similar format as the text of audio data 128 described above. The selected data of block 308, 316, or 324 as well as the summary of text 130 may comprise conversation data 210 that is to be stored on blockchain 134. In one embodiment, a summary of conversation audio data 138 may be generated without reference to text, but rather with reference to the audio data 138 or the audio recording 126. In this embodiment, no text version of the audio data 138 is necessarily generated. Block 326 is optional.

At block 328, one or more participants of the conversation that generated the audio data 138 performs a quality assurance step by manually checking some or all of (a) the selected data of block 308, 316, or 324, and/or (b) the summary of text 130. For example, the participant might ask computing device 104 to replay portions of audio recording 126, to read aloud some or all of summary of text 130, text of audio of data 128, or another text file generated during the method 300. The participant might read through summary of text 130 and/or text of audio data. The participant might then manually modify summary of text 130, text of audio of data 128, or another text file generated during the method 300. The participant might also generate new data that reflects the terms of the agreement of the conversation transmitted as audio data 138. As part of block 328, the participant may manually select which data is to be stored on the blockchain network 106 as conversation data 210. For example, the participant might talk to the computing system 100 through the microphone 102 and instruct the computing system 100 to add or modify a given clause before, after, or within a specified sentence. Block 328 is optional.

At block 330, the computing device 104 transmits conversation data to blockchain network 106, and that conversation data is stored as the conversation data 210 on the block 202 of the blockchain 134. Conversation data 210 may comprise one of or any combination of the following: (a) some or all of audio recording 126, (b) some or all of text of audio data 128, (c) some or all of summary of text 130, (d) some or all of selected data of block 308, 316, or 324, and (e) some or all of additional data generated during method 300. For example, conversation data 210 may comprise (a) the selected data of block 308, 316, or 324, and (b) the summary of text 130 generated at block 326. For a second example, conversation data 210 may comprise (a) text of audio data 128, and (b) summary of text 130. For a third example, conversation data 210 may comprise the summary of text 130.

To protect privacy, conversation data 210 may be encrypted. The decryption key may be provided to one or more of the participants as part of block 330.

At block 332, computing device 104 provides a transaction ID for conversation data 210 that was stored at block 330 of the method 300. The transaction ID allows a participant to efficiently locate the blockchain block 202 storing the conversation data 210 of block 330. Optionally, the transaction ID permits access to the conversation data 210 of block 330. The transaction ID may be the same as the decryption key provided at block 330.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications of computing device 104, of blockchain network 106, or related data available in the cloud. Doing so allows a user to access information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method of storing conversation data of a conversation onto a blockchain network, the conversation data comprising terms of an agreement, the method comprising:
receiving audio data of a conversation between two or more participants;
creating a transcript of at least some of the audio data, wherein the audio transcript includes a plurality of statements;
accessing a database comprising a plurality of words or phrases associated with a predefined topic to obtain a predefined set of one or more words associated with the predefined topic, wherein the plurality of words or phrases indicate creation of an agreement;
searching the transcript for the predefined one or more words to identify one or more statements, from the plurality of statements, relating to creation of an agreement;
filtering the transcript based on the predefined one or more words, comprising removing at least one statement, from the plurality of statements, that does not relate to the predefined topic, such that the filtered transcript does not contain information unrelated to the creation of an agreement; and
storing the conversation data onto a first block of a blockchain stored on the blockchain network, wherein the conversation data comprises the filtered transcript.

2. The method of claim 1, further comprising creating the summary of the transcript, wherein the conversation data comprises the summary of the transcript.

3. The method of claim 1, further comprising:
obtaining an indicator of when to begin recording the audio data;
analyzing the audio data for presence of the indicator; and
upon detecting the indicator within the audio data, performing the creating of the audio recording by recording the audio data.

4. The method of claim 1, further comprising:
creating an audio recording of at least some of the audio data;
accessing the database to obtain the predefined one or more words associated with the predefined topic;
searching the audio recording for the predefined one or more words; and
filtering the audio recording based on the predefined one or more words, wherein the conversation data comprises the filtered audio recording.

5. The method of claim 1, further comprising:
obtaining an indicator of which portion of the audio data to select for storage on the blockchain;
selecting the portion of the audio data; and
performing the creating of the transcript based on the selected portion of the audio data;
wherein the conversation data comprises the selected portion of the audio data.

6. The method of claim 1, further comprising:
converting the audio data to human-readable text while receiving the audio data;
analyzing the text for presence of the predefined one or more words; and
upon detecting the presence of the predefined one or more words, recording a subsequently received audio data as a recording onto a storage device;
wherein the file comprises the recording or a transcript of the recording.

7. The method of claim 1, further comprising, prior to storing the conversation data, encrypting the conversation data.

8. The method of claim 1, further comprising, subsequent to the storing the conversation data, outputting a transaction ID indicating (a) permission to access the conversation data, or (b) location of the conversation data within the blockchain.

9. The method of claim 1, further comprising:
creating an audio recording of at least some of the audio data; and
filtering the audio recording based on the filtered transcript, wherein the conversation data comprises the filtered audio recording.

10. The method of claim 1, wherein the blockchain is a public blockchain, further wherein the blockchain comprises a second block, the second block comprising a second conversation data obtained at least in part by filtering a second transcript generated from a second audio data, the filtering being performed based on a second predefined one or more words associated with two parties forming an agreement.

11. The method of claim 1, further comprising, prior to the storing;
outputting the filtered transcript to the two or more participants for review;

receiving additional instructions from at least one of the two or more participants; and modifying the filtered transcript based on the additional instructions.

12. A system, comprising:
a blockchain network comprising a blockchain;
a database comprising a plurality of words or phrases associated with a predefined topic;
a processor, wherein the processor is programmed to carry out a method of storing conversation data of a conversation onto a blockchain network, the conversation data comprising terms of an agreement, the method comprising:
receiving audio data of a conversation between two or more participants;
creating a transcript of at least some of the audio data, wherein the audio transcript includes a plurality of statements;
accessing a database comprising a plurality of words or phrases associated with a predefined topic to obtain a predefined set of one or more words associated with the predefined topic, wherein the plurality of words or phrases indicate creation of an agreement;
searching the transcript for the predefined one or more words to identify one or more statements, from the plurality of statements, relating to creation of an agreement;
filtering the transcript based on the predefined one or more words, comprising removing at least one statement, from the plurality of statements, that does not relate to the predefined topic, such that the filtered transcript does not contain information unrelated to the creation of an agreement; and
storing the conversation data onto a first block of the blockchain stored on the blockchain network, wherein the conversation data comprises the filtered transcript.

13. The system of claim 12, the method further comprising creating the summary of the transcript, wherein the conversation data comprises the summary of the transcript.

14. The system of claim 12, the method further comprising:
obtaining an indicator of when to begin recording the audio data;
analyzing the audio data for presence of the indicator; and
upon detecting the indicator within the audio data, performing the creating of the audio recording by recording the audio data.

15. The system of claim 12, the method further comprising:
creating an audio recording of at least some of the audio data;
accessing the database to obtain the predefined one or more words associated with the predefined topic;
searching the audio recording for the predefined one or more words; and
filtering the audio recording based on the predefined one or more words, wherein the conversation data comprises the filtered audio recording.

16. The system of claim 12, the method further comprising:
obtaining an indicator of which portion of the audio data to select for storage on the blockchain;
selecting the portion of the audio data; and
performing the creating of the transcript based on the selected portion of the audio data;
wherein the conversation data comprises the selected portion of the audio data.

17. The system of claim 12, the method further comprising:
converting the audio data to human-readable text while receiving the audio data;
analyzing the text for presence of the predefined one or more words; and
upon detecting the presence of the predefined one or more words, recording a subsequently received audio data as a recording onto a storage device;
wherein the file comprises the recording or a transcript of the recording.

18. The system of claim 12, the method further comprising:
creating an audio recording of at least some of the audio data; and
filtering the audio recording based on the filtered transcript, wherein the conversation data comprises the filtered audio recording.

19. The system of claim 12, the method further comprising, prior to the storing;
outputting the filtered transcript to the two or more participants for review;
receiving additional instructions from at least one of the two or more participants; and
modifying the filtered transcript based on the additional instructions.

20. A computer program product for a method of storing conversation data of a conversation onto a blockchain network, the computer program product comprising:
a computer-readable storage medium having computer-readable program code embodied therewith, the computer-readable program code executable by one or more computer processors to:
receive audio data of a conversation between two or more participants;
create a transcript of at least some of the audio data, wherein the audio transcript includes a plurality of statements;
access a database comprising a plurality of words or phrases associated with a predefined topic to obtain a predefined set of one or more words associated with the predefined topic, wherein the plurality of words or phrases indicate creation of an agreement;
search the transcript for the predefined one or more words to identify one or more statements, from the plurality of statements, relating to creation of an agreement;
filter the transcript based on the predefined one or more words, comprising removing at least one statement, from the plurality of statements, that does not relate to the predefined topic, such that the filtered transcript does not contain information unrelated to the creation of an agreement; and
store the conversation data onto a first block of a blockchain stored on the blockchain network, wherein the conversation data comprises the filtered transcript.

* * * * *